United States Patent [19]
Strub et al.

[11] Patent Number: 5,974,429
[45] Date of Patent: Oct. 26, 1999

[54] METHOD AND APPARATUS FOR UPDATING DISTRIBUTED DATABASES IN A TELECOMMUNICATIONS NETWORK

[75] Inventors: Guillaume Strub, Lagny-sur-Marne; Laurent Guillaume, Vincennes; Mathieu Hornsperger, Thorigny-sur-Marne, all of France

[73] Assignee: Northern Telecom Limited, Montreal, Canada

[21] Appl. No.: 08/922,945

[22] Filed: Sep. 3, 1997

[51] Int. Cl.[6] ................................................. G06F 17/30
[52] U.S. Cl. ........................................................ 707/203
[58] Field of Search ...................... 707/203, 10; 395/286

[56] References Cited

U.S. PATENT DOCUMENTS

| | | | |
|---|---|---|---|
| 5,008,814 | 4/1991 | Mathur | 395/200.51 |
| 5,212,789 | 5/1993 | Rago | 707/8 |
| 5,555,418 | 9/1996 | Nissson et al. | 395/286 |
| 5,751,574 | 5/1998 | Loebig | 364/187 |
| 5,771,386 | 6/1998 | Baumbauer | 395/710 |

FOREIGN PATENT DOCUMENTS

| | | |
|---|---|---|
| 0 702 496 A2 | 3/1996 | European Pat. Off. . |
| 2 264 575 | 2/1993 | United Kingdom . |
| WO 94/01819 | 1/1994 | WIPO . |

*Primary Examiner*—Wayne Amsbury
*Assistant Examiner*—Cheryl Lewis
*Attorney, Agent, or Firm*—Lee, Mann, Smith, McWilliams, Sweeney & Ohlson

[57] ABSTRACT

A method and apparatus for updating user data stored on databases distributed throughout a teleconmmunications network is described. A central database server stores a master copy of the user data from which a transaction journal may be created. The transaction journal includes every change in user data entered at the central database server during provisioning sessions. The remote nodes of the network contain databases which ideally store user data which is consistent with the user data records in the central database server. To achieve this the new transaction journal entries are propagated at regular intervals to the remote nodes. During a transition period, the central database server and the remote nodes are updated with new software. To accommodate nodes during the transition period which can be running on either the old or new software, the transaction journal preferably has two sets of user data, a first set for use with nodes running the old software and a second set for nodes running the new software. When a remote node is to be updated it is connected to the central database server and an audit is made of the software version and the age of the user data stored on the remote node. Based on the version number of the software, either the first or second set of transaction journal updates are propagated towards and applied on the remote node without halting call processing at the remote node.

24 Claims, 8 Drawing Sheets

THE JOURNAL OF TRANSACTIONS IS PROPAGATED TOWARDS THE LEADING MMCS

METHOD AND APPARATUS FOR UPDATING DISTRIBUTED DATABASES IN A TELECOMMUNICATIONS NETWORK

The present invention relates to a method of seamlessly updating user data in a network of intelligent devices with distributed databases including remote intelligent devices after a software update of at least one remote intelligent device. The present invention also relates to a network of intelligent devices with distributed databases including remote intelligent devices in which user data may be seamlessly updated after a software update of at least one remote intelligent device, as well as to an intelligent device suitable for use as a central server in the network and methods of operating the same.

TECHNICAL BACKGROUND

Figure 1:
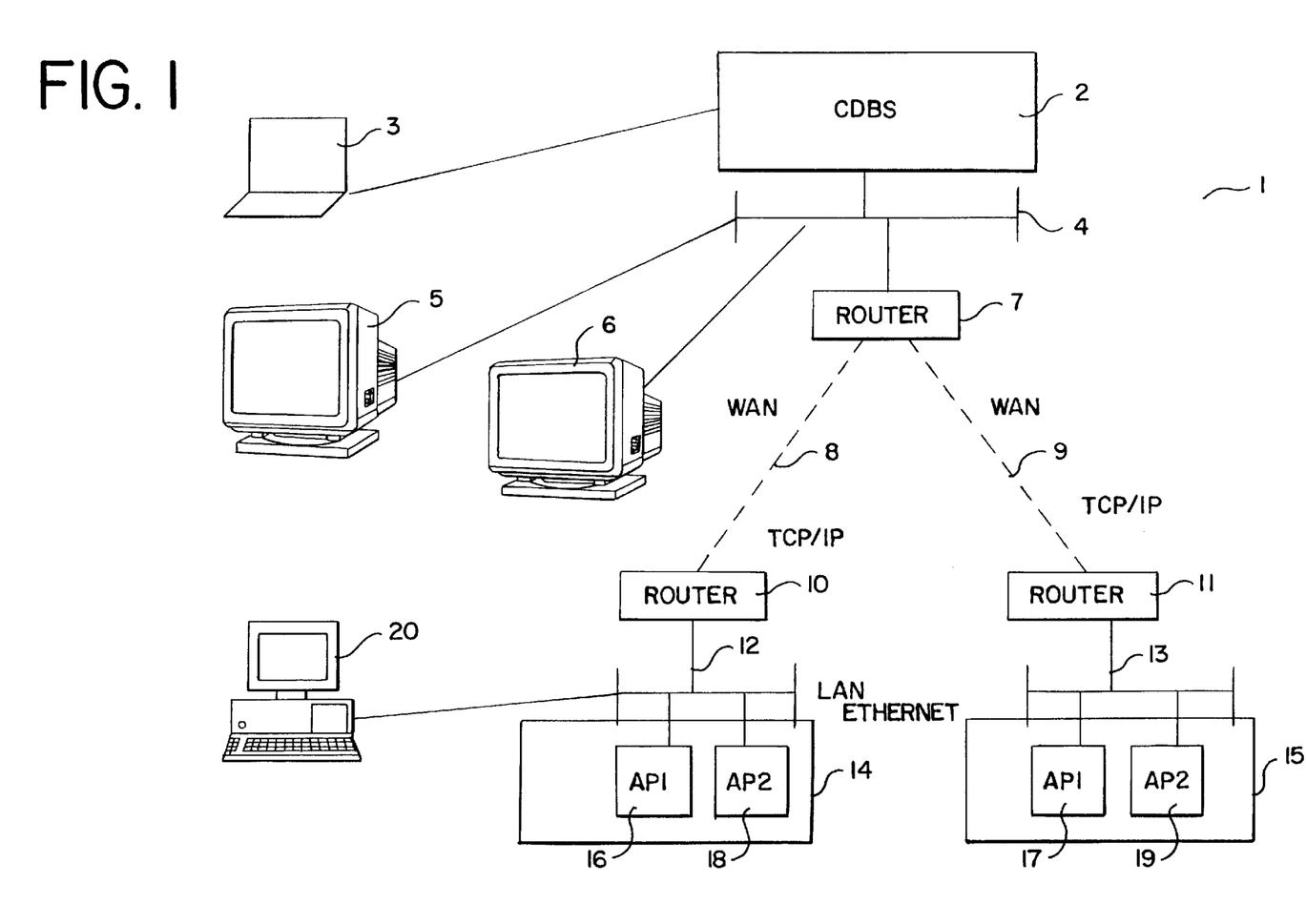
FIG. 1 is a schematic representation of a network with which the present invention may be used.
Figure 2:
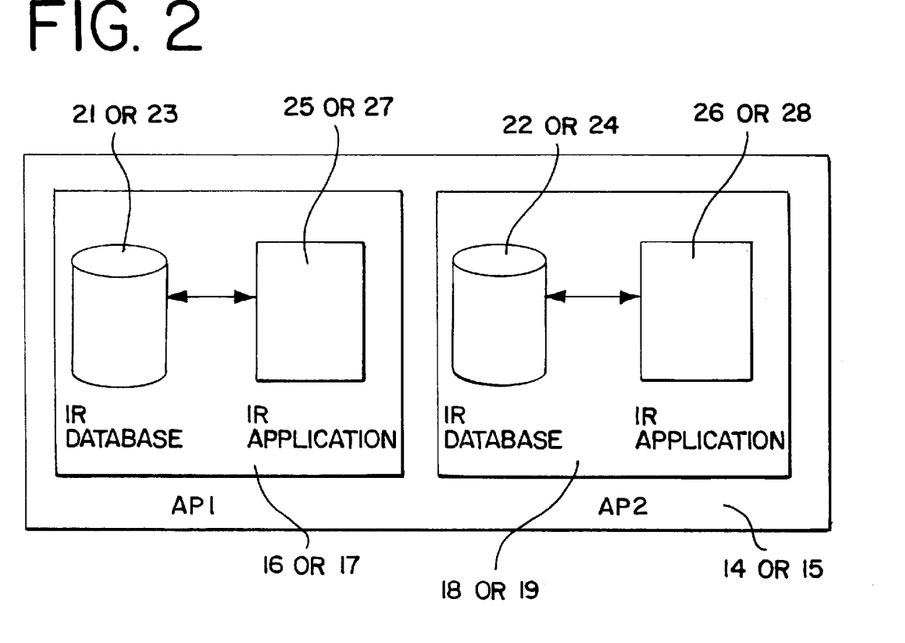
FIG. 2 is a schematic representation of a node of the network of FIG. 1.

A telecommunications network 1 will be described schematically with respect to FIGS. 1 and 2. Network 1 may include nodes 14, 15 for routing calls from telephone or mobile phone subscribers. Within the network 1, a central data base server (CDBS) 2 allows provisioning of the central database itself (the CDBS database), propagating user data updates to different nodes 14, 15 of the network at a user determined refresh rate, creation of back-up records, e.g. magnetic tapes, to load new or faulty nodes of the network and provides maintenance tools to the administrator of the network. Within each node 14;15 there is at least one hardware platform called an application platform 16, 18; 17, 19 which includes processing capability and is responsible for carrying out the various procedures of the node, e.g. routing of calls, particularly Intelligent Routing (IR) of calls. The application platform 16, 18; 17, 19 is preferably duplicated within each node to provide service continuity if there is a component failure in one of the platforms 16, 18; 17, 19. Thus, node 14 includes a primary application node (API) 16 and a secondary application platform (AP2) 18. Each of application platforms 16,18; 17, 19 obtains its user data from an associated application platform database 21, 22, 23, 24 respectively. The CDBS database holds the master database for the network, i.e. the CDBS database is the centralized repository of the user data stored in the application platform databases 21–24. At all times the data in the CDBS database should ideally be consistent with the data in the application databases 21–28, i.e. ideally all the remote databases 21–24 should be updated instantaneously with any changes made to the CDBS database. In practice, it is normally sufficient to update databases 21–24 at intervals of a few minutes or of hours.

The monitor 3, the terminals 5,6 and the workstation 20 allow provisioning of the CDBS either directly or via the network. To allow communication between the nodes 14, 15 and the CDBS 2, routers 7, 10 and 11 and telephone or other communication lines 8, 9 may be provided. The application platforms 16, 18 and 17, 19 are connected by Local Area Networks (LAN) 4, 12, 13 as may be the monitors 5, 6 and the CDBS 2. The complete network 1 may be configured as a Wide Area Network (WAN). A typical communication protocol within the WAN could be TCP/IP as is well known from the Internet.

During provisioning of the CDBS 2 user records may be amended. These amendments need to be distributed to the other nodes 14, 15 as soon as and as accurately as possible. Changes made centrally to the CDBS database by provisioning, e.g. a change in the dialing number of a subscriber, addition of a client, addition of a new dialing prefix, are propagated from the CDBS 2 to the local IR databases 21; 23 on the primary application platforms 16; 17 of each node 14, 15. The databases 22; 24 of the secondary application platforms 18; 19 are updated from the primary application platforms 16; 17, respectively. If the secondary database 22; 23 cannot be updated for some reason, updates to the primary database are rolled back to keep the two databases 21, 22; 23, 24 consistent.

A method of updating software in a telecommunications network is known from GB-A-2 264 575 which involves a script corresponding to a software version having an associated active time, the script being sent to every site within the network together with the associated active time. The software becomes available at each node in accordance with the associated active time. This method involves the generally known concept of data stamping and has the disadvantage that the new software and the new corresponding user data must be sent to each node and stored. Thus both the old and the new software as well as the old and new data must be storable at each node. This requires more resources at each node than necessary. Further, a problem can occur if both the new data and the new software are data stamped separately. If the new software installs itself properly but the new data does not or vice-versa, the node does not function correctly after the update. One way of avoiding this is to include the new data and the new software together in an encapsulated self executing package. However, when the data in the databases is stored separately as "home" data, e.g. telephone numbers associated directly with the relevant node, and "foreign" data, i.e. telephone numbers associated with other nodes, each software package must be customized for each node.

The first of these problems has been addressed by WO 94/01819. In this known system both the new software and the change data are sent to the remote node and stored alongside the existing data and software. Means are provided to phase in the new software and its new corresponding data slowly in parallel with the operation of the existing system. This at least theoretically eliminates the problem with date stamping the software update mentioned above but exacerbates the problem with updating user data. As two versions of the software are running on the same node at the same time, not just one but two sets of user data must be kept up-to-date over the period in which both software versions are in operation. Once the software update has been completed the user data updating must return to a single update appropriate for the new software whereas other nodes in the system are still running on the old version of the software.

U.S. Pat. No. 5,212,789 describes a similar method of updating software and user data in a distributed processing environment, e.g. a telephone switching network. In accordance with this known method a software update is loaded on a processor and the new user data therefor is loaded in parallel to the old user data. The processor is restarted using the new software but the old user data. Once all processors have been updated with the new software, a command is given and all the processors change over to using the new user data. This known method suffers from the same problem as WO 94/01819 because in a distributed system it takes a long time to install the new software on each node of the system. Hence, there is a long wait before the complete system may be changed over to the new user data. In this transitional time both old and new user data must be updated by some method. If the system is upgraded node-by-node, there exists in the system nodes with new or old software during a transitional period depending upon whether they have been upgraded or not. No method is described of how to differentially update the differing sets of data present in the system.

The present invention has as its object to provide a telecommunications network and a method of operating the network which solves the problems with the prior art methods of updating software and user data.

The present invention also has the object to provide a telecommunications network and a method of operating the network in which nodes of the network can receive a software update by various means and the user data required for the various software versions can be maintained consistent within the network.

The present invention also has the object to provide a telecommunications network and a method of operating the network in which nodes of the network can receive a software update and the new user data therefor without interruption of call processing on any node.

The present invention also has the object to provide a telecommunications network and a method of operating the network in which user data is stored reliably.

SUMMARY OF THE INVENTION

The present invention provides a method of updating software and corresponding user data in a telecommunications network including at least one remote intelligent device running a first version of software and at least one remote intelligent device running a second version of the software, comprising the steps of: generating an updated transaction journal including at least one set of a first set of entries containing first user data to be used with the first version of software and a second set of entries containing second user data for use with the second version of said software, and updating corresponding user data on each said remote intelligent device by propagating and applying to each remote intelligent device one of said first and said second user data sets as determined by the version number of the software running on the propagated-to device.

The present invention also provides a telecommunications network comprising: at least one remote intelligent device running a first version of software and at least one remote intelligent device running a second version of the software; means on a first intelligent device for generating an updated transaction journal including at least one set of a first set of entries containing first user data to be used with a first version of software and a second set of entries containing second user data for use with a second version of said software; and means for updating the corresponding user data on each said remote intelligent device including means for propagating and applying one of said first and second user data sets to each said remote intelligent device as determined by the version number of the software running on that device.

The present invention also provides an intelligent device for use in a telecommunications network including a plurality of intelligent devices containing software and storing corresponding user data to be used with the software, comprising: means for generating an updated transaction journal having at least one set of a first set of entries containing first user data to be used with a first version of software and a second set of entries containing second user data for use with a second version of said software; and means for propagating one of said first and second user data sets towards any of the plurality of intelligent devices in the network as determined by the version number of the software running on each said intelligent device.

The present invention also provides a method of operating an intelligent device for use in a telecommunications network including a plurality of intelligent devices containing software and storing corresponding user data to be used with the software, comprising the steps of: generating on said intelligent device an updated transaction journal having at least one set of a first set of entries containing first user data to be used with a first version of software and a second set of entries containing second user data for use with a second version of said software; and propagating at least one of said first and second user data sets towards any of the plurality of the intelligent devices as determined by the version number of the software running on each said device.

A preferred embodiment of the present invention includes storing the journal of transactions on a central database server whereby the transaction journal has two sets of user data, one for use with a remote device running first software and another for a remote device running a second software. The journal of transactions may include more sets of user data if more that two versions of the software is present in the system at any one time.

The dependent claims define individually further embodiments of the present invention. The present invention, its embodiments and advantages will now be described with reference to the following drawings.

DESCRIPTION OF THE ILLUSTRATIVE EMBODIMENTS

The present invention will be described with reference to specific embodiments and particular drawings but the invention is not limited thereto but only by the claims. The drawings are only non-limiting schematic representations.

Figure 3:
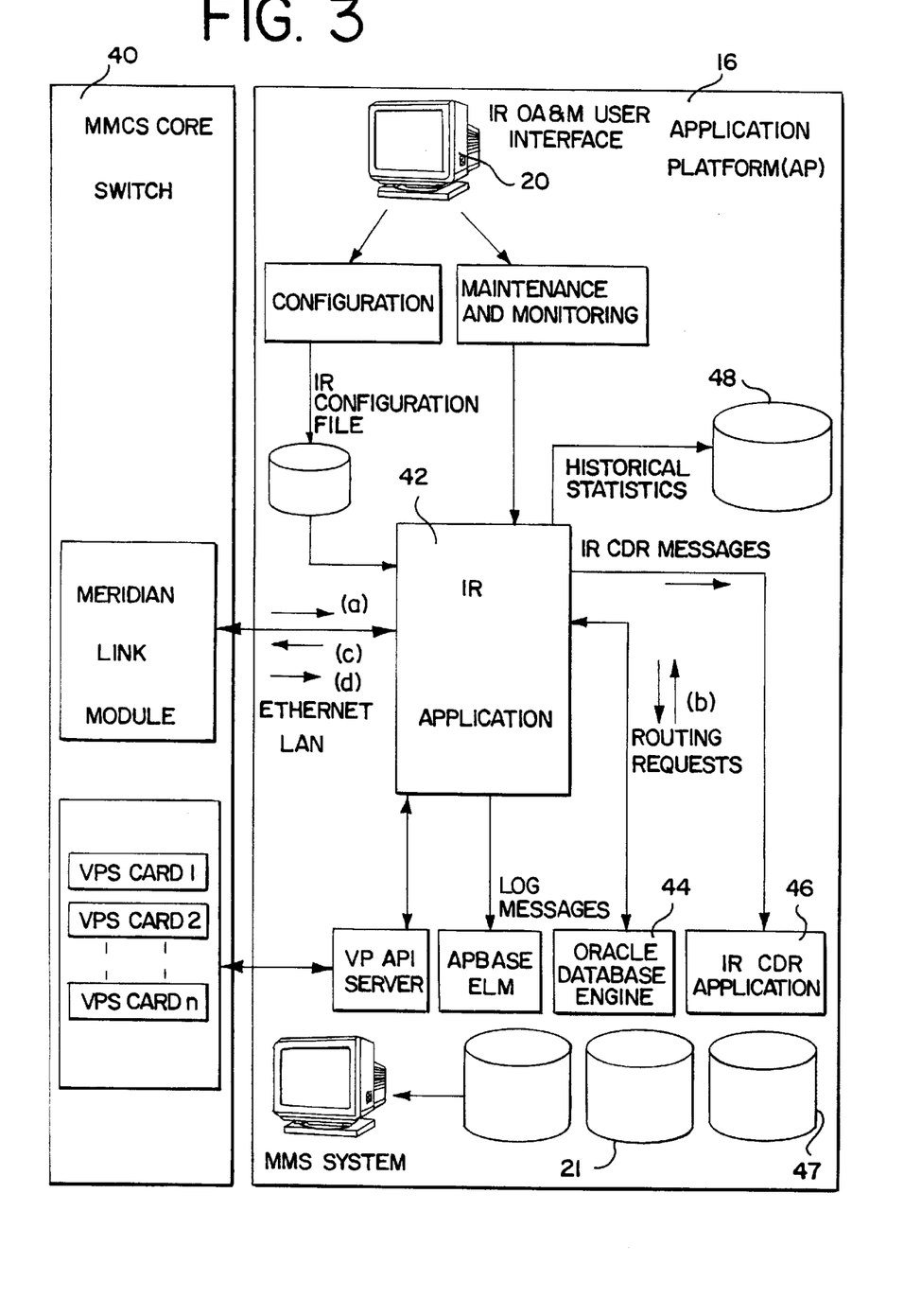
FIG. 3 is a schematic representation of a node in accordance with the present invention.

FIG. 3 is a schematic representation of one possible non-limiting example of an intelligent node 14 according to a first embodiment of the present invention. Node 14 is for use in a telecommunications network 1 of the type shown schematically in FIG. 1 and including a CDBS 2 and a plurality of nodes such as 14, 15. Node 14 includes a core switch 40 and duplicated application platforms 16 and 18 (only 16 is shown in FIG. 3). The application platform 16 includes a processor 42 running software for processing requests from the switch 40 and for communicating instructions and messages to the switch 40. Switch 40 may have its own processing means (not shown). A call is processed in the following way.

a) Processor 42 receives a routing request from the switch 40, e.g. when a subscriber attempts to telephone with another subscriber.

b) The application program running on processor 42 sends a query to the database 21 using a database query engine 44 and obtains the routing details for the routing request.

c) The application program running on processor 42 passes the routing details back to the switch 40 with instructions of how to route the call.

d) The processor 42 receives the confirmation of routing the call from the switch 40.

e) On completion of the call the application program running on processor 42 sends a message to the billing application for calculation of the charge for the call. The billing record is stored in the database 47.

Figure 4:
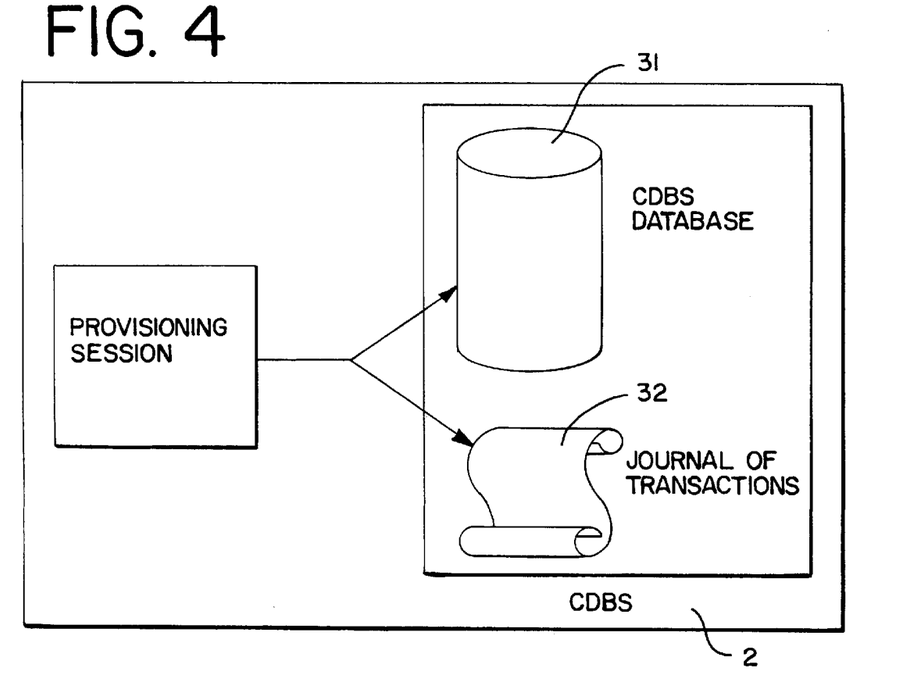
FIG. 4 is a schematic representation of a provisioning session.

The database 21 on node 14 contains the user data for routing and for user specific services. This user data is a copy of the central (master) store for all user data in a database on the CDBS 2. A user transaction according to the present application is any action, e.g. add change or delete, made on any of the entities in the database of CDBS 2. Such user transactions are made during a provisioning session of CDBS 2 as shown schematically in FIG. 4. Examples of a transaction are: input of the data for a new node 14, 15, new dialing number for a subscriber, or an update of prefixes on a dialing plan. A user transaction is identified by a transaction number called a User Transaction ID (UT ID) which is preferably unique to the network. It is preferred if the UT ID is assigned in a monotonically increasing or decreasing manner, e.g. is a number larger or smaller than the previous number allocated, or is an alphabetical or alphanumeric indicator which has an attribute which monotonically increases or decreases. The transactions in the CDBS database 31 are recorded in a journal of transactions 32. The journal of transactions 32 is a log of every provisioning change made since the last time the journal was purged. The transaction journal 32 preferably contains the unique transaction ID, the date the transaction was applied to the CDBS database, the user ID of the user who applied for the transaction to be made and a description of the transaction.

Propagation is the mechanism which spreads data towards the nodes 14,15 from the CDBS 2 in order to maintain data consistency within the network. In each node 14; 15 there is preferably a primary application platform (AP1) 16; 18 and an identical second application platform (AP2) 17;19 respectively. The primary application platform 16, 18 is generally updated directly from the CDBS 1 and the secondary platform 17, 19 is updated subsequently from the first platform 16, 18 respectively.

A node 14, 15 is said to be stale if it can no longer be updated because the necessary records therefor have been deleted from the transaction journal 32.

Figure 5:
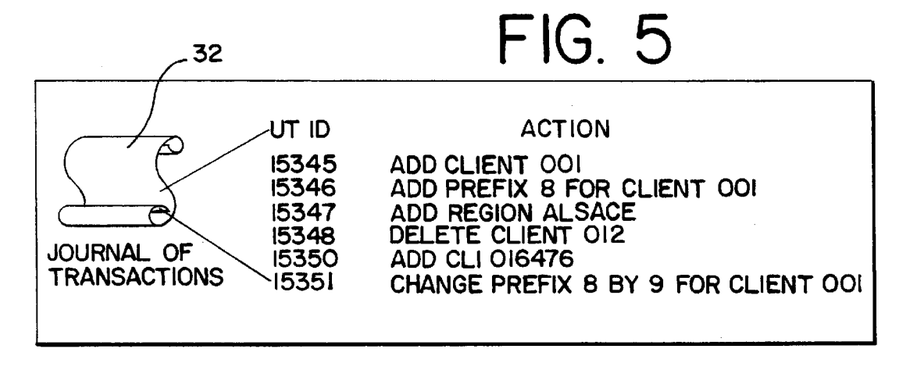
FIG. 5 is a schematic representation of a transaction journal.

FIG. 5 shows a representative set of entries in the journal of transactions 32. As shown in FIG. 5, a UT ID is given to each transaction by the CDBS 2. The sequence of UT ID's need not be continuous, for example the entry 15349 is missing in FIG. 4 but is preferably still monotonically increasing or decreasing. During a provisioning session of the CDBS 2, the journal of transactions 32 is updated with each new transaction and each transaction is applied immediately to the database 31. Subsequently, the new transactions are propagated to the other databases of the network in turn at regular time intervals in the form of the journal of transactions 32. The journal of transactions 32 need not be a complete record of all transactions since the network was instantiated. To save storage space it is preferred if the journal of transactions is limited in size, say to 10,000 transactions. The exact number should be chosen so that it is sufficient to keep all records which may be needed for updating the remote databases but short enough to discard entries which are so old that they are no longer required. Preferably, the journal 32 may be purged regularly by various methods of which the following are just a few non-limiting examples:

the journal 32 may be made a circular so that it always contains 10,000 entries and the newest transaction deletes the oldest transaction.

the journal 32 may be purged at regular intervals, e.g. every night, whereby a limited number, say 4,000 entries are always kept.

the entries in the journal 32 may be purged at regular intervals, e.g. every night, which are older than a certain number of days, i.e. after a predetermined user transaction retention period. As the date of the transaction is noted in the journal 32, it is possible to delete entries based on their date of entry into the database, e.g. if they are more than so many days old, e.g. 15 days.

Figure 6:
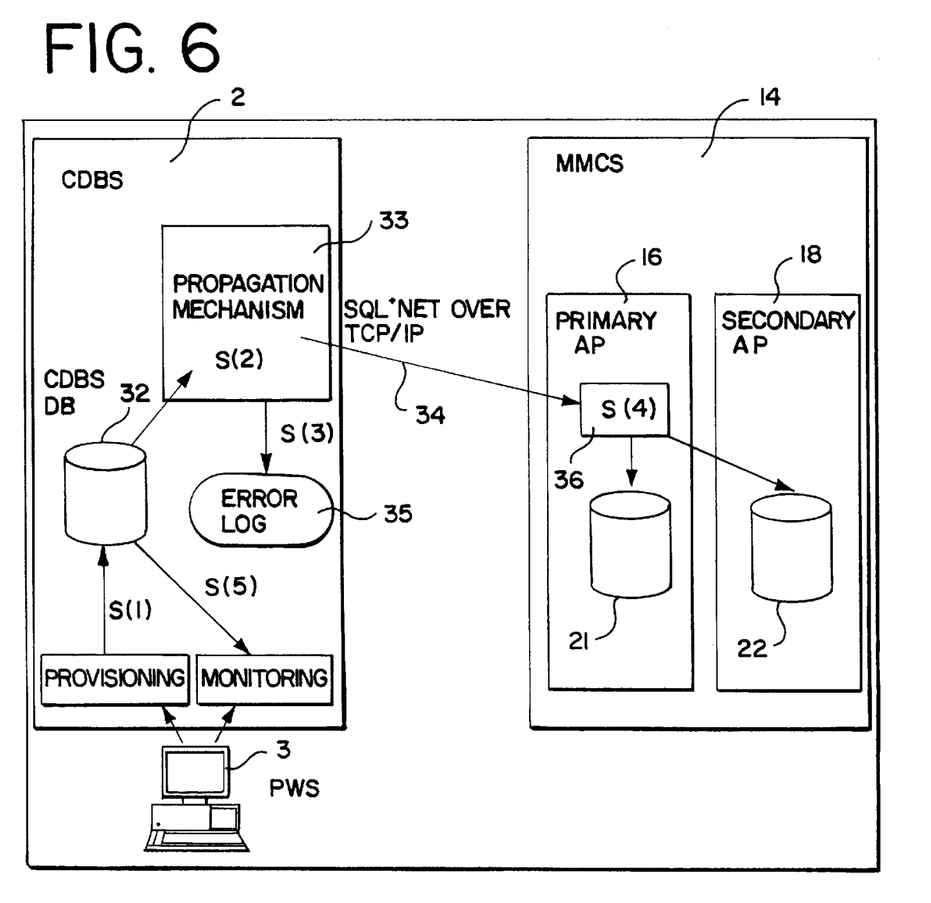
FIG. 6 is a schematic representation of propagation within the network of FIG. 1.

In accordance with the present invention it is preferred if the propagation of the journal of transactions 32 is performed asynchronously and in a deferred manner so as to reduce network traffic peaks, to allow for non-continuous network lines and to make use of low cost network links where available. The propagation mechanism is shown schematically in FIG. 6:

S1. The provisioning session with the monitor 3 results in immediate updating of the CDBS database 31. These updates are stored in the journal of transactions 32.

S2. At a periodic time which can be set for each node 14, 15 the propagating mechanism 33 sends all new transactions not yet applied on the propagated-to-node 14 over the network via a transmission line 34 using suitable protocols such as TCP/IP. If the propagation is successful the last UT ID (called the CDBS_MMCS_UT ID) propagated to the node is 14 is logged.

S3. Any errors in transmission are logged in an error log event file 35.

S4. A further mechanism 36 ensures that the user transactions are applied to the database 21 on the primary application platform 16 and the database 22 on the secondary platform 18. If an irreparable error occurs, the procedure is aborted and all transactions are returned to their status before the updating attempt.

S5. Monitoring screens allow monitoring of the complete procedure.

Figure 7:
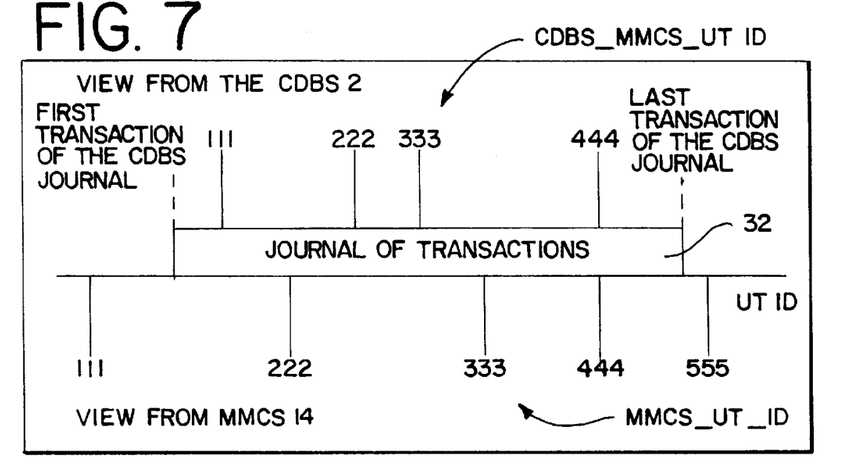
FIG. 7 is a schematic diagram showing various states of the transaction journal on the central database server (CDBS) of FIG. 1.

The propagating mechanism 33 includes checking the compatibility of the node 14 with the CDBS 1 as well as comparing the logged CDBS_MMCS_UT ID for the node 14 and the actual latest UT ID (the MMCS-UT ID) stored in the database 21 as part of an audit of node 14. The various situations which can occur are shown schematically in FIG. 7. The normal situation is shown as record 444. Here the CDBS_MMCS_UT ID logged in the CDBS 1 is the same as the last UT ID (MMCS-UT ID) stored in the node 14 (MMCS 14). All the updates will be applied from the MMCS-UT ID stored in database 21 up to the latest UT ID in the journal of records. At 333 a situation is shown in which the CDBS_MMCS_UT ID is lower than the MMCS-UT ID which is stored in the database 21. This can occur if the node 14 has been updated by another mechanism, e.g. by tapes. All the transactions between the MMCS-UT ID and the last record in the journal of transactions are applied and a warning message is issued. At 222 the MMCS-UT ID is lower than the CDBS_MMCS-UT ID possibly due to a recovery at node 14 after a serious error. All updates between the MMCS-UT ID and the last record in the journal of transactions will be applied and a warning message issued. At 111 a stale database is shown, the MMCS-UT ID is lower than the oldest transaction in the journal of transactions. The database 21 cannot be updated. Finally an unripe database 21 is shown as 555. Here the MMCS-UT ID is higher than the last entry in the journal of transactions. No propagation is possible and an error message is issued.

Figure 8:
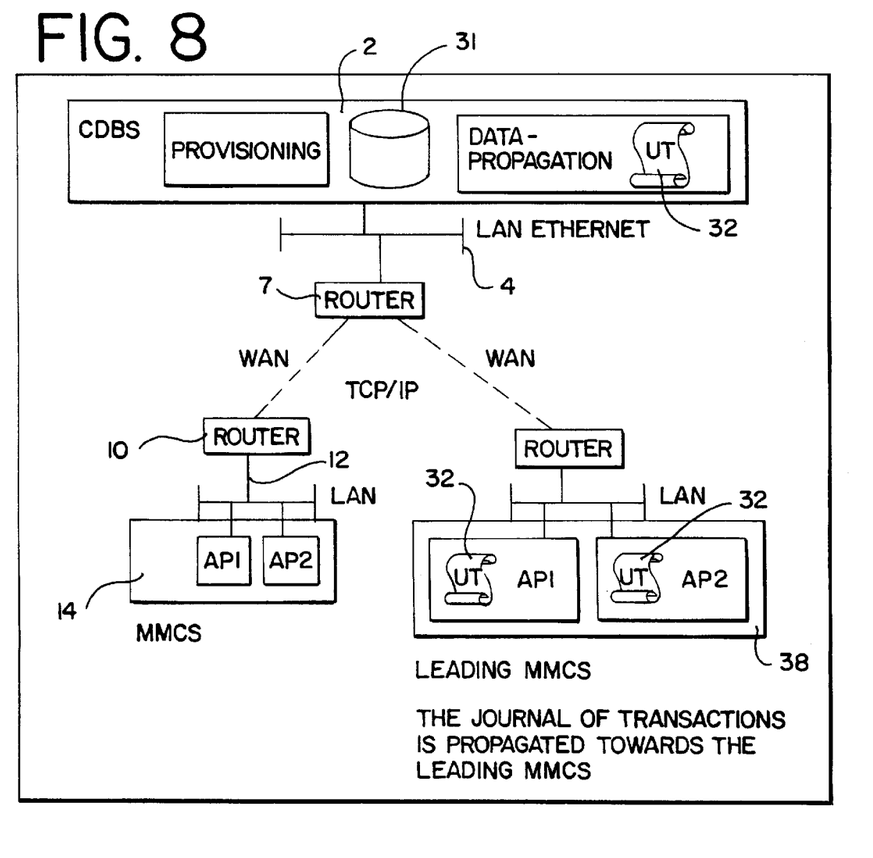
FIG. 8 is a schematic representation of propagation of the journal of transactions in accordance with the present invention.
Figure 9:
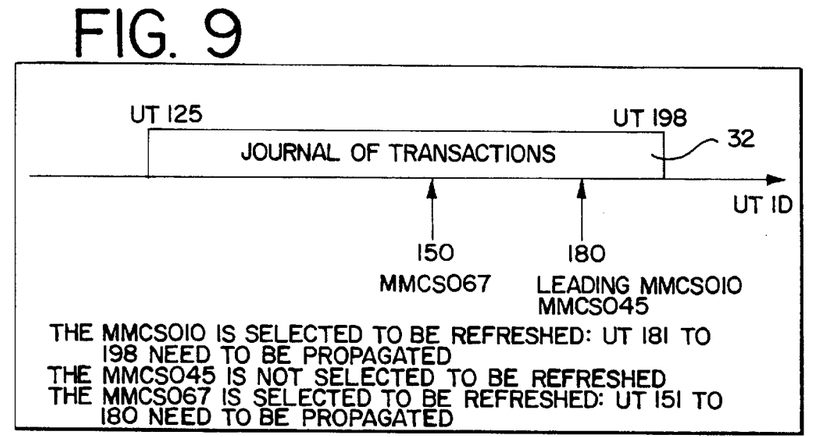
FIG. 9 is a schematic diagram showing various states of the journal of transactions on a node of the network in accordance with the present invention.

In accordance with the present invention it is preferred if a back-up is provided for the journal of transactions 32 in one of the nodes 14, 15 which will be called the leading node 38. As shown schematically in FIG. 8 the journal of transactions 32 is first propagated and then applied to the leading node 38 after which the journal 32 is stored in node 38 in suitable non-volatile memory. This provides a back-up copy of the journal 32 which may be used to recover the CDBS 2, if necessary. It is preferred if any further node 14 may only be updated with a transaction which has been committed on the leading node 38. The situations which can occur are shown schematically in FIG. 9. The last UT ID in the leading node 38 is 180 whereas the last UT ID in the transaction journal 32 is 198. It is determined that this difference is sufficient for an update and the additional entries between 180 and 198 are transferred to the leading node 38. Any other node 14, 15 with an MMCS-UT ID of 180 is not updated at the same time as this MMCS-UT ID coincides with the MMCS-UT ID of the leading node 38. Any node with an MMCS-UT ID lower than 180, e.g. 150 is updated at this time with the difference between 150 and 180. In accordance with the present invention the leading node 38 may be changed at any time by transferring the journal of transactions 32 to another node 14, 15 and setting this node as the new leading node.

The above described method of updating the databases 21–24 of nodes 14, 15 is not suitable when software has been upgraded on some of the nodes 14, 15 which requires different user data than the previous version of the software. In this situation some of the nodes 14, 15 will be running new software and will require the new user data to be updated and some will be running the old software and will need the old data to be updated. In accordance with the present invention it is not required that the new software can run using the old data as is necessary for instance in accordance with the known method of U.S. Pat. No. 5,212,789. With reference to FIG. 1 let us assume that the software on node 15 is to be updated to provide new services. These new services require different data than the old services, e.g. a particular service may only be carried out with the entry of a password with the new software whereas the old software required no password. After the node 15 is updated with the new software the complete system is no longer consistent—the node 14 requires the old data and the node 15 requires the new data. The CDBS 2 must be able to update both versions of the data during provisioning and must be able to automatically update the nodes 14 and 15 with the correct data. One solution to this problem in accordance with one embodiment of the present invention would be to store two versions of the database 31 with each version distinguished by a version number, e.g. the phase number. This solution is an improvement over the known method of WO 94/01819 as only one database is duplicated, namely the centralized CDBS database 31. However, such a solution would not provide the most compact user data as the UT ID's would be allocated independently for each version.

Figure 10:
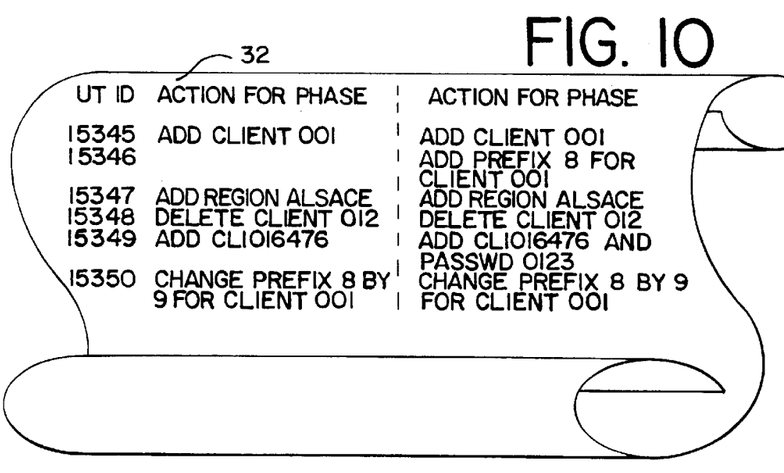
FIG. 10 is a schematic representation of the journal of transactions in accordance with the present invention.

In accordance with a preferred embodiment of the present invention the transaction journal 32 contains two or more sets of user data, for example in two or more action columns as shown schematically in FIG. 10, whereby the data in the left hand column is to be used with the old version of the software (phase 1) and the data in the other column is to be used with the new software (phase 2). Consistency between the UT ID's of the first column is maintained with those of the second column. For example where the action to be taken is the same (e.g. UT ID 15345), the action and UT ID are the same in the two columns. Where the action for the new software is more extensive (e.g. UT ID 15349 addition of the password), the different actions are recorded under the same UT ID in the different columns. Where no action is required with the phase 1 software (see UT ID 15346), a blank is left in the UT ID list of the first column and the correct action is recorded in the second column. If an action is required with the old software but is not required with the new, a blank would appear in the second column. The software for running on nodes 14, 15 and for CDBS 2 is written so that a blank in the list of UT ID's in the journal of transactions 32 does not cause an error message provided the UT ID's are monotonically increasing or decreasing.

In accordance with the present invention the propagating mechanism described with reference to FIG. 6 may still be used with this embodiment of the invention with the addition that only the relevant column of the transaction journal 32 is propagated to propagated to the node 14, 15 depending upon the software version running on the node. Where a leading node 38 is used as a back-up the complete transaction journal 32 with both columns is propagated from the CDBS 2 to the leading node 38. Only the relevant column of the transaction journal 32 is applied to the leading node 38 which is appropriate for the software running on the node but the complete transaction journal 32 is stored on node 32 as a back-up for the CDBS 2.

The actual committed records in the central database 31 may be made as described previously with reference to FIG. 1–9. Instead of storing both columns of the transaction journal 32 it is also within the scope of the present invention to use a single record to indicate both behaviors when there are different actions for the phase 1 or phase 2. To achieve this each record in database 31 specifies the actions necessary for both behaviors and the transaction journal 32 is generated as required by a database query well known to the skilled person from relational databases. By this means the transaction journal 32 is generated as required by a snapshot query of the user data stored in the database. This means that database 31 increases in size only in as far as there are differences between the data required for phase 1 and phase 2 without complete duplication of all entries in the transaction journal 32.

When all the nodes of the system have been upgraded, the older versions of the records in the database 31 may be deleted. Hence, if there are 100 nodes on the system excluding the CDBS, a total of 102 updates are required, 100 for the nodes 14, 15, one at the start of the transition period for the CDBS 2 and one at the end if the transition period for the CDBS 2. This last update can be omitted and the records left until they are automatically deleted during a purge. The general situation of a change from phase n software to phase n+1 software is shown schematically in FIG. 11. Between times $T_1$ and $T_2$ the CDBS 2 and all nodes 14, 15 of the network are configured for the software of phase n. The journal of transactions 32 has only one column. At time $T_2$ the CDBS 2 is upgraded to deal with updating nodes 14, 15 in the network running either phase n or n+1 software by means of the dual column journal of transactions 32 mentioned above. Between time $T_2$ and $T_3$ the nodes are still using the software of phase n. At time $T_3$ the first node is upgraded to the phase n+1 software. The CDBS 2 deals with this non-consistency in the network for the transition period $T_3$ to $T_4$ with the dual-column journal of transactions 32 by supplying the relevant sets of data from the journal of transactions 32 appropriate for the software present on the propagated-to node. At time $T_4$ all nodes 14, 15 of the network have been upgraded to phase n+1 and the CDBS database 31 has been purged of all data corresponding to the phase n software. At times beyond $T_4$ only phase n+1 software is used and the transaction journal 32 has a single column.

Figure 11:
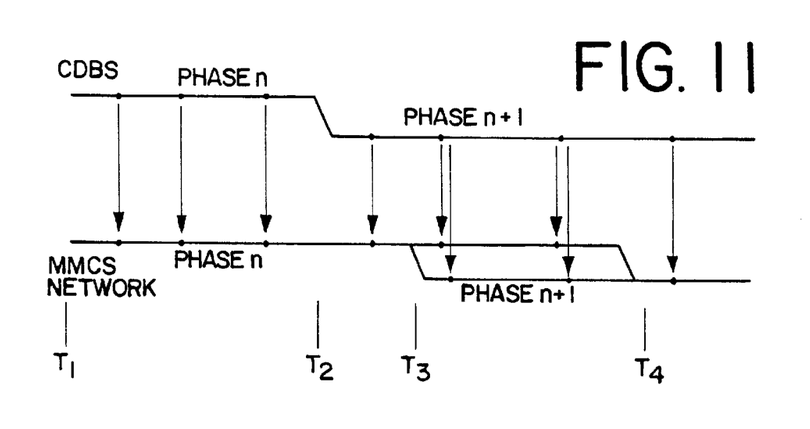
FIG. 11 is a schematic representation of the state of the network in accordance with the present invention during a transitional period.

Thus, in accordance with the present invention only the database in the CDBS 2 is duplicated, alternatively and preferably, only increased in size by the additional data items required for the new software, during the transition period $T_3$ to $T_4$. The databases 21–24 in the remote nodes 14, 15 only contain one version of the user data at any one time, even during the transition period. Each database 21–24 in nodes 14, 15 is seamlessly updated with the new user data as required for the version of software installed on each node 14, 15. In accordance with the present invention more than two columns can be included in the transaction journal 32 if there are more than two software versions active in the network at any one time.

Figure 12:
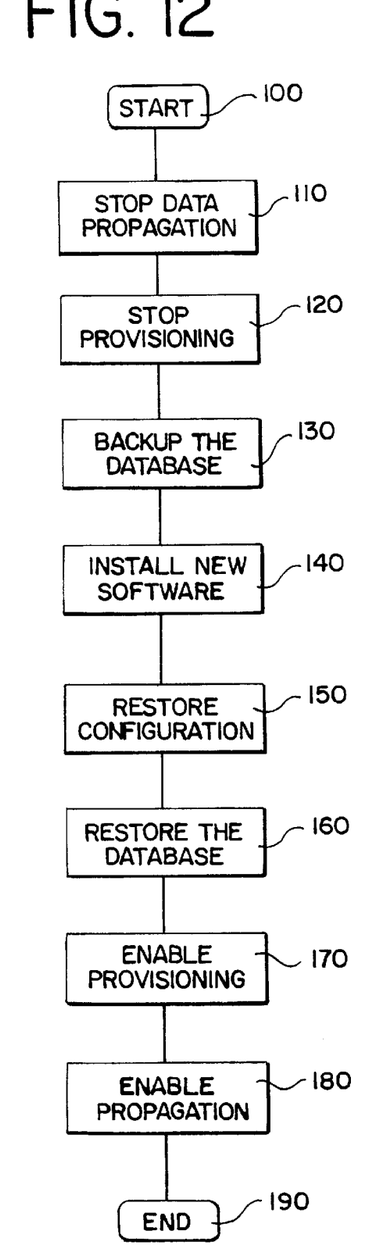
FIG. 12 is a schematic flow diagram of a software update on the CDBS in accordance with the present invention.

The flow diagram method of updating the CDBS 2 from phase n to phase n+1 is shown schematically in FIG. 12. In step 110 the propagation of data from the CDBS 2 is stopped. In step 120 the provisioning of the CDBS 2 is stopped so that any person attempting to provision the CDBS 2 receives a message that this is not possible at this time. In step 130 the old version of the database 31 is backed-up in case the update is unsuccessful and the database 31 must be restored to the old version. In step 140 the new software for phase n+1 is installed on the CDBS 2. This may be done by a variety of methods known to the skilled person including use of tapes or diskettes or any of the methods described in WO 94/01819, GB 2,264,575 and U.S. Pat. No. 5,212,789. The software may be checked and certified at this time.

In step 150 the configuration of the CDBS 2 is restored, e.g. the configuration file of the CDBS 2 is updated to a new configuration if a new node has been added to the network. In step 160 the database 31 is restored. In this procedure any data or instructions specially required for the new software may be added to the database 31. In particular the capability may be provided at this time within the database 31 to create the dual-column journal of transactions 32 and if desired, to allow dual records for phase n and phase n+1 to be stored as a single record. This may be done by importing the backed-up version of the database 31 from step 130 plus the additional data and then restarting the database. In steps 160 and 170 and the provisioning and propagation of data are enabled, respectively. The CDBS 2 is now in the state necessary to be connected to a mixed network with phase n and phase n+1 nodes.

Figure 13:
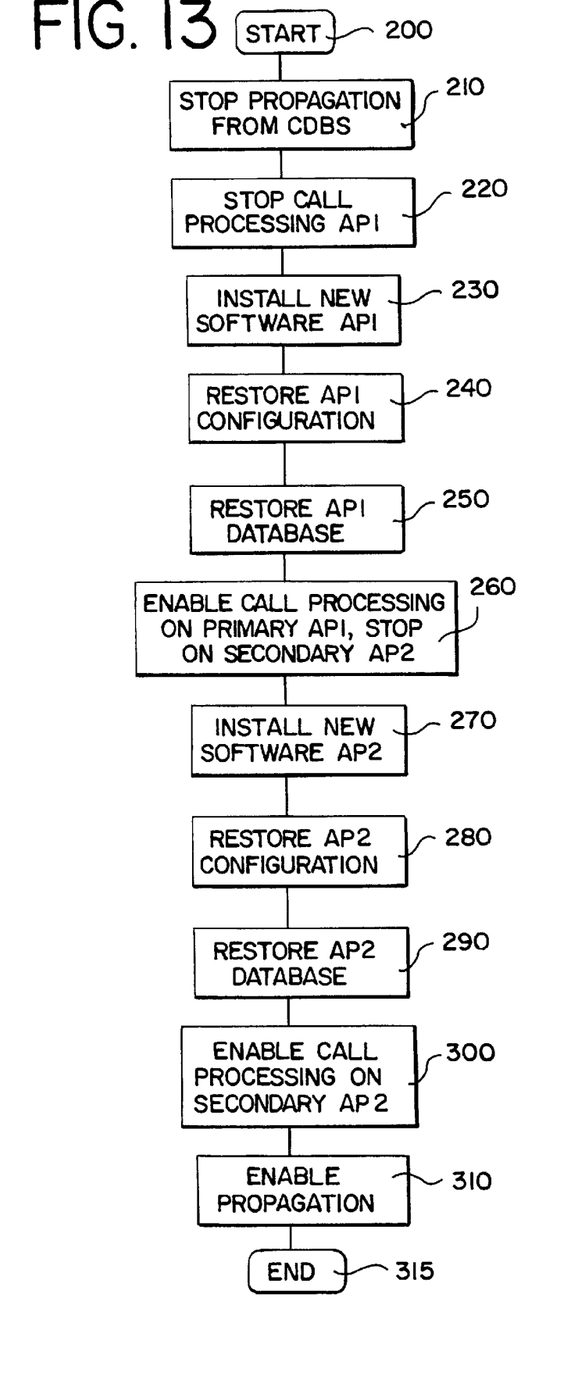
FIG. 13 is a schematic flow diagram of software updating of remote node in accordance with the present invention.

The flow diagram of updating a node 14, 15 with new software is shown schematically in FIG. 13. In step 210 the propagation from the CDBS 2 to the node is stopped. In step 220 the primary application platform AP1 is stopped from processing calls. All processing is passed to the secondary application platform. In step 230 the new software is installed on the primary application platform. In step 240 the configuration of the application platform is restored and any checks carried out. In step 250 the database associated with the primary application platform is restored using a back-up copy of the CDBS database. The transactions stored on the tape will probably not be completely up-to-date but this will be corrected later in step 300. In step 260, the primary application platform resumes call processing and the secondary application platform is stopped from processing calls. Steps 270, 280 and 290 are identical to steps 230, 240, 250 except the activity is carried out on the secondary application platform rather than the first. In step 300, call processing is resumed for the secondary application platform AP2. In step 310, data propagation from the CDBS 2 is enabled and an immediate updating using the second column of the transaction journal 32 can be carried out.

Figure 14:
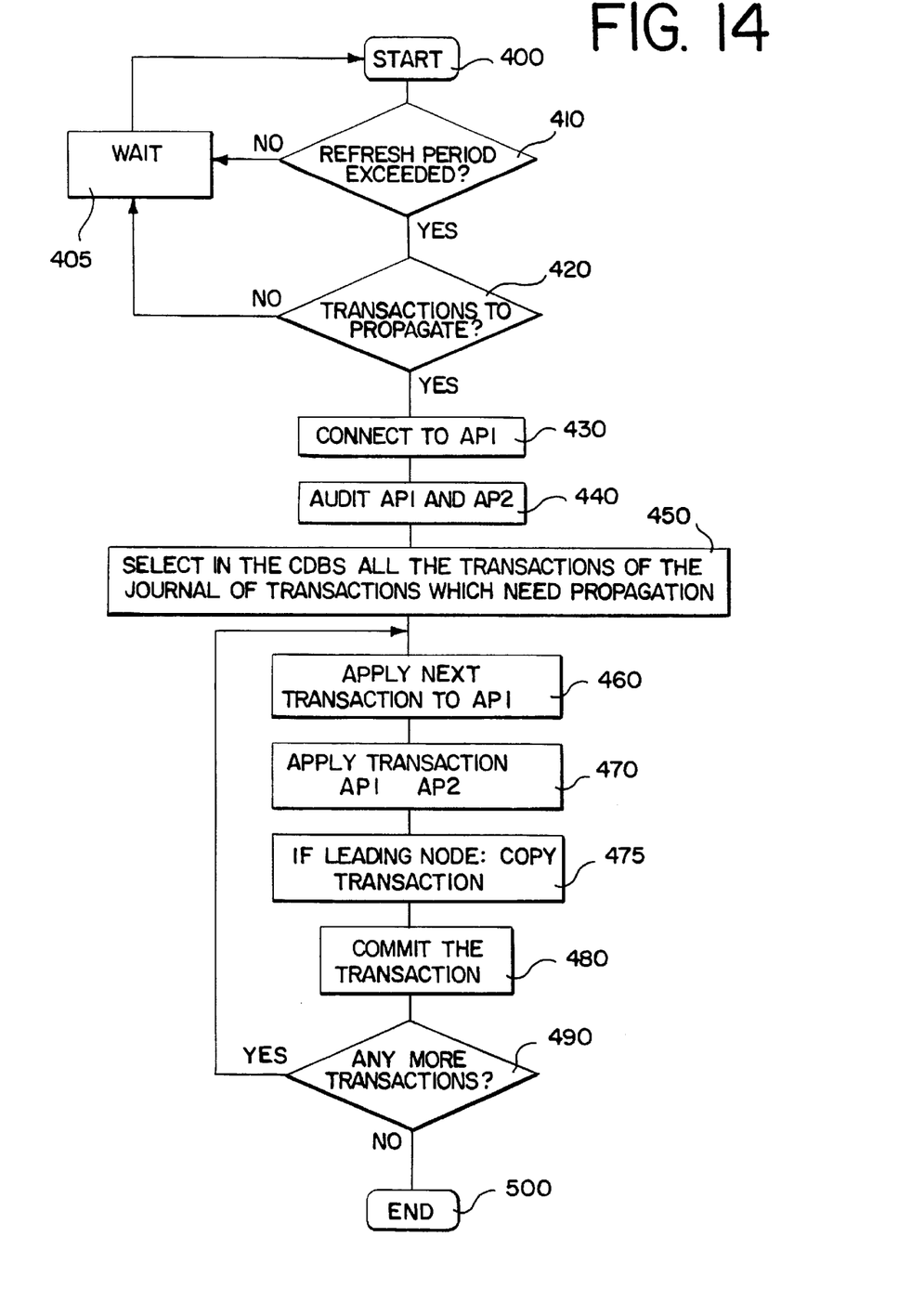
FIG. 14 is a schematic flow diagram of user data updating on a remote node in accordance with the present invention.

FIG. 14 is a schematic flow diagram of an updating of a remote node by propagation from the CDBS 2. In step 410 the CDBS 2 determines at predetermined or regular intervals if the refresh period for the particular node has been exceeded. If no, the procedure waits a few seconds (step 4405) or the present propagation attempt is terminated and a propagation procedure may be attempted with another node. If yes, it is determined in step 420 whether the transaction journal on the CDBS 2 contains transactions with a later UT ID than the last UT ID stored for this node in the CDBS 2 after the last user data update, i.e. that there are new transactions to be propagated. If no, the procedure waits or attempts to propagate to another node. If yes, a connection is made to the primary application platform of the relevant node in step 430. In step 440 an audit is made of the software version and the age of user data in the database of the remote node using the latest UT ID therein. In step 450 the relevant transaction s are selected from the journal of transactions 32 in CDBS 2 depending upon the software version running on the application platform as determined from the audit. In step 460 the first transaction from the relevant column of the journal of transactions 32 is propagated to the remote node and applied. In step 470 the updated transaction on the database of the primary application platform AP1 is applied to the database of the secondary application platform AP2. If the propagated-to node is the leading node, the transaction is copied into the database on the node in step 475. If the steps 460 and 470 have been carried out successfully, the transaction is committed to the databases, i.e. saved in step 480. If there was a problem in steps 460 or 470, this particular transaction is not committed and the databases on the primary and secondary application platforms are returned to their previous state. In step 490 it is determined if there are any more transactions to process, if yes the steps 460 to 490 are repeated. If no the procedure is terminated and propagation to another node can be attempted.

The present invention may be applied to improve the known methods of software updating detailed in U.S. Pat. No. 5,212,789 or WO 94/01819. Both these known methods load both old and new data onto application platforms at the same time. An embodiment of the present invention will be described with reference to WO 94/01819 which is incorporated herein by reference. The skilled person will appreciate that the present invention may be similarly applied to known methods such as disclosed in U.S. Pat. No. 5,212,789.

In the known method according to WO 94/01819, both old and new versions of software are stored in a node of a telecommunications network for a transitional trial period. This may be achieved in accordance with the present invention in that the new software is installed on one of the primary and secondary application platforms AP1 or AP2. New traffic may be gradually introduced to the new version of the software with this introduction being made so that old transactions are executed to their conclusion on the old software while new transactions are executed by the new software. The various versions of the software have their own user data stored on the respective databases associated with each application platform. If it is necessary to update this user data during the transitional period, the CDBS 2 sets up communications first to the primary application platform AP1 and then to the secondary application platform AP2 in turn. During the audit step with each application platform, it is determined which software is running on which platform and the relevant transaction journal is created in CDBS 2, propagated to the node and applied to the relevant database.

The present invention as described above provides a scheme for updating user data records in a distributed telecommunications network of intelligent nodes without interrupting call processing on any node and while allowing different versions of software to be running concurrently on different nodes. Each of the software versions may require different user data and there is no requirement that the older user data of a previous version must be compatible with newer software. While the invention has been shown and described with reference to preferred embodiments, it will be understood by those skilled in the art that various changes or modifications in form and detail may be made without departing from the scope and spirit of this invention.

What we claim is:

1. A method of updating software and corresponding user data in a telecommunications network including at least one remote intelligent device running a first version of software and at least one remote intelligent device running a second version of the software, comprising the steps of:
   generating an updated transaction journal including at least one set of a first set of entries containing first user data to be used with the first version of software and a second set of entries containing second user data for use with the second version of said software, and
   updating corresponding user data on each said remote intelligent device by propagating at least one of said first and said second user data sets to each remote intelligent device and applying to each remote intelligent device only one of said first and said second user data sets as determined by the version number of the software running on the propagated-to device.

2. Method according to claim 1, wherein said generating step includes storing said transaction journal including said first and second set.

3. Method according to claim 1, further comprising the step of updating the software on each intelligent device from the first version to the second version.

4. Method according to claim 1, wherein each entry in the first or second user data sets is allocated a unique identifier, and the identifiers are allocated in a monotonically increasing or decreasing manner.

5. Method according to claim 4, wherein each user data record which has an entry in both the first and second sets has the same unique reference indication in both sets.

6. Method according to claim 1, wherein the first device is a central database server.

7. Method according to claim 1, wherein a further intelligent device is a leading device and a copy of the transaction journal is kept on said leading device.

8. Method according to claim 7, wherein the propagating step includes only propagating the first or second user data set to the plurality of intelligent devices which have been previously applied on said leading device.

9. A telecommunications network comprising:
   at least one remote intelligent device running a first version of software and at least one remote intelligent device running a second version of the software;
   means on a first intelligent device for generating an updated transaction journal including at least one set of a first set of entries containing first user data to be used with a first version of software and a second set of entries containing second user data for use with a second version of said software; and
   means for updating the corresponding user data on each said remote intelligent device including means for propagating at least one of said first and said second user data sets to each remote intelligent device and applying only one of said first and second user data sets to each said remote intelligent device as determined by the version number of the software running on that device.

10. A telecommunications network according to claim 9, further comprising means to store said transaction journal on said first intelligent device including said first and second sets.

11. A telecommunications network according to claim 9, further comprising means for updating each remote intelligent device from the first version of the software to the second version of the software.

12. A telecommunications network according to claim 9, wherein each entry in the first or second user data sets has a unique identifier, and the identifiers are allocated in a monotonically increasing or decreasing manner.

13. A telecommunications network according to claim 12, wherein each user data record which has an entry in both the first and second sets has the same unique reference indication in both sets.

14. A telecommunications network according to claim 9, wherein the first device is a central database server.

15. A telecommunications network according to claim 9, further comprising a further intelligent device as a leading device and a copy of the transaction journal is kept on said leading device.

16. A telecommunications network according to claim 15, wherein the means for propagating is adapted to propagate only the first or second user data set which has been previously applied on said leading device.

17. An intelligent device for use in a telecommunications network including a plurality of intelligent devices containing software and storing corresponding user data to be used with the software, comprising:
   means for generating an updated transaction journal having at least one set of a first set of entries containing first user data to be used with a first version of software and a second set of entries containing second user data for use with a second version of said software; and
   means for propagating only one of said first and second user data sets towards any of the plurality of intelligent devices in the network as determined by the version number of the software running on each said intelligent device.

18. An intelligent device according to claim 17, further comprising means for storing said transaction journal including said first and second sets.

19. An intelligent device according to claim 17, wherein each entry in the first or second user data sets has a unique identifier, and the identifiers are allocated in a monotonically increasing or decreasing manner.

20. An intelligent device according to claim 19, wherein each user data record which has an entry in both the first and second sets has the same unique reference indication in both sets.

21. A method of operating an intelligent device for use in a telecommunications network including a plurality of intelligent devices containing software and storing corresponding user data to be used with the software, comprising the steps of:

generating on said intelligent device an updated transaction journal having at least one set of a first set of entries containing first user data to be used with a first version of software and a second set of entries containing second user data for use with a second version of said software; and propagating only one of said first and second user data sets towards any of the plurality of the intelligent devices as determined by the version number of the software running on each said device.

22. A method according to claim 21, further comprising the step of storing the transaction journal including said first and second sets.

23. A method according to claim 21, wherein each entry in the first or second user data sets is allocated a unique identifier, and the identifiers are allocated in a monotonically increasing or decreasing manner.

24. Method according to claim 23, wherein each user data record which has an entry in both the first and second sets has the same unique reference indication in both sets.

* * * * *